US012637083B2

(12) United States Patent
Keidel et al.

(10) Patent No.: US 12,637,083 B2
(45) Date of Patent: May 26, 2026

(54) VEHICLE, DEVICE, COMPUTER PROGRAM AND METHOD FOR ESTIMATING A ROAD PROFILE

(71) Applicant: Bayerische Motoren Werke Aktiengesellschaft, Munich (DE)

(72) Inventors: Frank Keidel, Poing (DE); Tilman Nowak, Erfurt (DE); Alexander Born, Munich (DE); Sean Brown, Deggendorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 230 days.

(21) Appl. No.: 18/570,136

(22) PCT Filed: Jun. 20, 2022

(86) PCT No.: PCT/EP2022/066705
§ 371 (c)(1),
(2) Date: Dec. 14, 2023

(87) PCT Pub. No.: WO2022/268701
PCT Pub. Date: Dec. 29, 2022

(65) Prior Publication Data
US 2024/0270257 A1 Aug. 15, 2024

(30) Foreign Application Priority Data
Jun. 23, 2021 (DE) ..................... 10 2021 116 283.1

(51) Int. Cl.
B60W 40/06 (2012.01)
B60W 50/00 (2006.01)
(Continued)

(52) U.S. Cl.
CPC ........ B60W 40/06 (2013.01); B60W 50/0097 (2013.01); B60W 2552/53 (2020.02); G06V 10/98 (2022.01); G06V 20/588 (2022.01)

(58) Field of Classification Search
None
See application file for complete search history.

(56) References Cited

U.S. PATENT DOCUMENTS

| | | | |
|---|---|---|---|
| 6,718,259 B1 * | 4/2004 | Khosla | G01C 21/26 701/96 |
| 2018/0039269 A1 * | 2/2018 | Lambermont | G05D 1/81 |

(Continued)

FOREIGN PATENT DOCUMENTS

| | | | | |
|---|---|---|---|---|
| CN | 112550294 A * | 3/2021 | | B60W 60/00 |
| DE | 10 2019 112 413 A1 | 11/2020 | | |
| WO | WO 2004/031691 A1 | 4/2004 | | |

OTHER PUBLICATIONS

International Search Report (PCT/ISA/210) issued in PCT Application No. PCT/EP2022/066705 dated Sep. 27, 2022 with English translation (5 pages).
German-language Written Opinion (PCT/ISA/237) issued in PCT Application No. PCT/EP2022/066705 dated Sep. 27, 2022 with English translation (9 pages).
German Search Report issued in German Application No. 10 2021 116 283.1 dated Mar. 4, 2022 with partial English translation (12 pages).

(Continued)

*Primary Examiner* — Amelia Vorce
(74) *Attorney, Agent, or Firm* — Crowell & Moring LLP

(57) ABSTRACT

Systems, methods, and apparatuses are provided for estimating a road profile in surroundings of a vehicle by using a state function that describes the road profile and a Bayes filter for adapting the state function based on surroundings measurement data. Sensor-captured surroundings measurement data is received. Information about an uncertainty regarding at least either the state function or the sensor-captured surroundings measurement data is received. The information is taken as a basis for adapting a state inaccuracy that influences an attenuation of the Bayes filter.

15 Claims, 8 Drawing Sheets

300

310 — Receive sensor-captured surroundings measurement data

320 — Receive information about an uncertainty regarding at least either the state function or the sensor-captured surroundings measurement data 330 — Take the information as a basis for adapting a state inaccuracy that influences an attenuation of the Bayes filter

(51) Int. Cl.
  G06V 10/98 (2022.01)
  G06V 20/56 (2022.01)

(56) References Cited

U.S. PATENT DOCUMENTS

| | | | | |
|---|---|---|---|---|
| 2018/0217612 | A1* | 8/2018 | Vladimerou | G01C 21/3822 |
| 2020/0126429 | A1* | 4/2020 | Fröhlich | G01S 19/396 |
| 2020/0201350 | A1* | 6/2020 | Newman | E01F 9/576 |
| 2022/0169280 | A1 | 6/2022 | Brown et al. | |
| 2022/0178718 | A1* | 6/2022 | Xia | B60W 60/00256 |
| 2024/0092397 | A1* | 3/2024 | Carter | B60W 50/0097 |
| 2024/0095945 | A1* | 3/2024 | Zhu | G06V 10/82 |

OTHER PUBLICATIONS

Khosla, D.; "Adaptive Kalman filter approach for road geometry estimation", Intelligent Transportation Systems, Oct. 12, 2003, pp. 1145-1151, vol. 2, XP010672670 (7 pages).

Huang, Y, et al.; "A Novel Adaptive Kalman Filter With Inaccurate Process and Measurement Noise Covariance Matrices", Transactions on Automatic Control, U.S.A., Feb. 1, 2018, pp. 594-601, vol. 63, No. 2, XP055961658 (8 pages).

Kalman-Filter, In: Wikipedia, The Free Encyclopedia editing status, Jun. 18, 2021 URL: https://de.wikipedia.org/w/index.php?title= Kalman-Filter&oldid=213057306[abgerufen am Apr. 3, 2022] (11 pages).

* cited by examiner

Fig. 1a
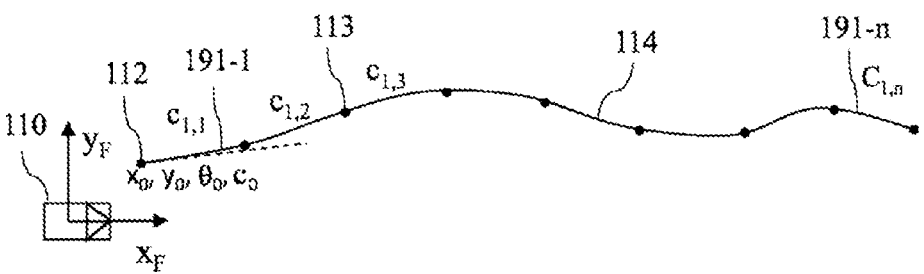
☐ Vehicle
—— Boundary line (visible)
--- Centerline (middle of the road, not visible)
Fig. 1b
Fig. 1c
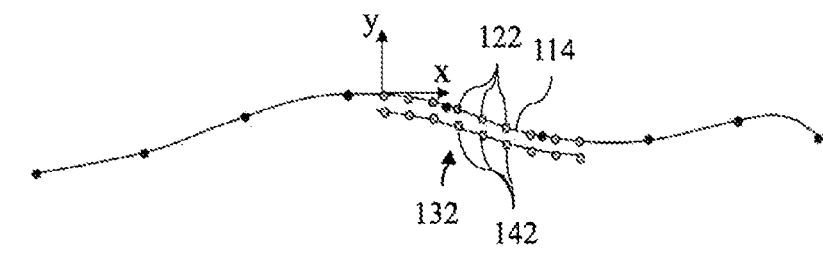
122 ——◦ Sample points on clothoid spline
142 ——◦ Sample points on camera polynomial ◈ Sample points on clothoid spline
◈ Sample points on camera polynomial ◈ Sample points on clothoid spline

Fig. 4a

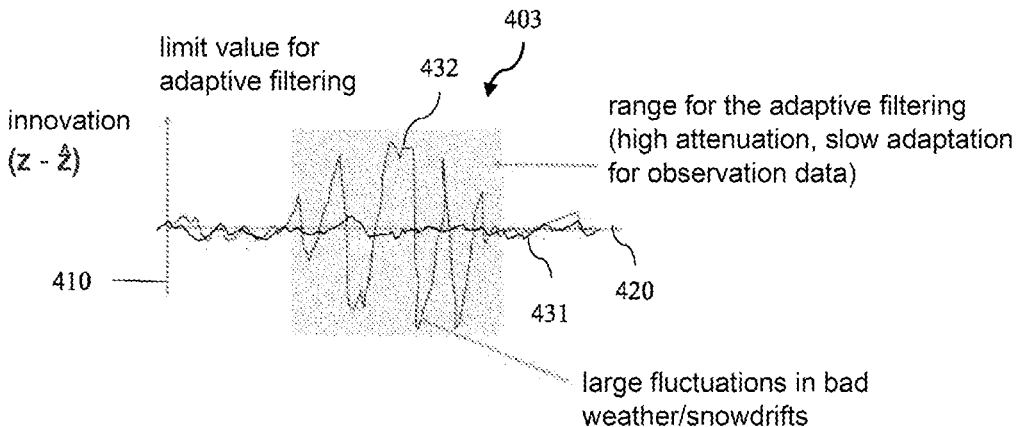

limit value for
adaptive filtering    432    401 innovation
$(z - \hat{z})$    range for the adaptive filtering
(lower attenuation, fast adaptation
for observation data)

443    442

410    420 minimum time
of exceeding    431    420

402 limit value for
switching off    432 innovation
$(z - \hat{z})$    automated driving function
switched off

444

442

410    431    420 limit value for
adaptive filtering

403 limit value for
adaptive filtering    432 innovation
$(z - \hat{z})$    range for the adaptive filtering
(high attenuation, slow adaptation
for observation data)

410    420

431 large fluctuations in bad
weather/snowdrifts 522
522
522
522
514
512

Distance-dependent
uncertainties (radius corresponds
to standard deviation in y direction)

Surroundings measurement data

512
State function
(estimated road centreline)

Vehicle with vehicle coordinate system

510

512b
522
512a

Observation data at time t2

Vehicle at time t2

522
Observation data at time t1
534    510

Reference data

Vehicle at time t1

510

602

600

VEHICLE, DEVICE, COMPUTER PROGRAM AND METHOD FOR ESTIMATING A ROAD PROFILE

BACKGROUND AND SUMMARY

Examples of the present subject matter relate to a vehicle, a device, a computer program and a method for estimating a road profile. In particular, examples relate to a concept for estimating a road profile for a vehicle controlled in an at least partially automated manner.

When controlling some (partially) automated or autonomously driving vehicles, concepts for estimating the road profile are used that the controller of such a vehicle takes as a basis for making driving decisions.

The road profile can be approximately described by determining a road model that corresponds to a state function. This allows the road profile to be ascertained in particular relative to a position and/or an orientation of the vehicle. Properties of the road profile may be, by way of example, width, direction, curvature or number of adjacent lanes or the position of the vehicle in relation to the lanes (for example the vehicle is in the right-hand, middle or left-hand lane of three lanes).

The vehicle can then be controlled in such a way that it follows the road profile, avoids obstacles or changes lane, for example. The underlying state function can be recursively adapted by means of a Bayes filter on the basis of observations of the surroundings. By way of example, camera systems or other surroundings sensors are used for the observations. It has been shown in practice that curves or obstacles can be detected later than desired, which means that the estimated road profile needs to be adapted quickly for safe operation. By contrast, the Bayes filter for adapting the estimated road profile has a certain inertia, however, which is an impediment to fast adaptation of the estimated road profile.

It has also been shown that a decrease in inertia results in impairment of the lateral guidance when controlling vehicles. This means that the vehicle has an uneven driving behavior, for example.

There is therefore a need for an improved concept for estimating a road profile.

This need can be met by the independent and dependent claims of the present disclosure.

Examples of the present subject matter are based on the insight that the inertia, or reaction speed, of Bayes filters can be adapted or regulated on the basis of the situation to improve their responsiveness compared with concepts having constant attenuation, firstly in order to avoid uneven driving behavior and secondly, if the situation so requires, to increase reaction speed. In Bayes filters, such as for example the Kalman filter, this can be achieved specifically by adapting the attenuation thereof according to the situation. By way of example, the attenuation is increased (i.e. surroundings measurement data are given a lighter weighting and a prediction or forecast of the road profile is given a heavier weighting) if the vehicle is travelling on a straight section and more stable lateral guidance is desired. On the other hand, the attenuation can be decreased if, as in the case of a curve that is detected late, for example, faster adaptation of the (previously) estimated road profile is desired. Based on experience, it is in particular possible for captured surroundings measurement data to be taken as a basis for estimating how the attenuation needs to be adapted. As such, surroundings measurement data indicate a curve that is detected late, for example, if they are similar (e.g. within a predetermined scope) in successive recursion steps and differ greatly (e.g. more than a predetermined threshold value) from an estimation of the road profile. In this case, the reaction speed can be increased and therefore the attenuation can be decreased, in order to react to the curve in good time. Otherwise, the surroundings measurement data can also indicate that the surroundings measurement data are affected by (undesirably) great uncertainty or are subject to large fluctuations if they deviate from one another greatly (e.g. by more than a predetermined limit value) in successive recursion steps. In this case, the attenuation can be increased in support of more stable estimation of the road profile. It is also proposed, in support of better attenuation, that the attenuation be adapted on the basis of the distance or the speed of the vehicle, for example on the basis of a distance-dependent or speed-dependent uncertainty regarding the surroundings measurement data. When a Kalman filter is used, the attenuation is adjusted for example by adapting a parameter for specifying a process noise in the Kalman filter.

Examples provide a method for estimating a road profile in surroundings of a vehicle by using a state function that describes the road profile and a Bayes filter for adapting the state function on the basis of surroundings measurement data. The vehicle in question is any ground-based vehicle. In examples, the vehicle is a vehicle that is controlled in a partially or fully automated manner and that may be designed to take the estimated road profile as a basis for making driving decisions in an automated manner. The Bayes filter can be understood to mean a recursive method that provides for a state, in the present case the state function for reproducing the road profile in the surroundings of the vehicle, to be estimated recursively on the basis of predictions and past observations. The state function can be predicted in the so-called "prediction step". The state function can comprise one or more functions, in particular polynomial or clothoid functions. The surroundings measurement data can be understood here as the observations and for example can be or comprise sensor data, image information or data derived therefrom from observation of the surroundings (vehicle surroundings) of the vehicle. As such, the surroundings measurement data can comprise for example one or more polynomial functions, derived on the basis of image information, for reproducing the observations.

The method comprises receiving sensor-captured surroundings measurement data, also referred to as "observation data" or "observations". This can be accomplished by virtue of information about the surroundings being captured and/or processed by a camera or (surroundings) sensor system.

Moreover, the method comprises receiving information about an uncertainty regarding at least either the state function or the sensor-captured surroundings measurement data. The information about the uncertainty can thus contain information about the uncertainty regarding the state function, but additionally or alternatively also information about the uncertainty regarding the surroundings measurement data. The information about the uncertainty is ascertained for example on the basis of a comparison of the state function with the surroundings measurement data, a comparison of surroundings measurement data measured at successive times and/or a comparison of measured surroundings measurement data and surroundings measurement data predicted using the state function. As explained in more detail later, the information can also alternatively or additionally be ascertained on the basis of information about a speed of the vehicle.

The method further comprises taking the information as a basis for adapting a state inaccuracy that influences an attenuation of the Bayes filter. The attenuation can be decreased for example, if desired or required, for faster responsiveness or increased for better lateral guidance and more even driving behavior. In particular, the method thus permits the attenuation to be adapted according to the situation in support of adaptive responsiveness of the Bayes filter. The method can therefore also be understood as a method for regulating the attenuation.

In some examples, receiving the information about the uncertainty comprises receiving the uncertainty on the basis of the sensor-captured surroundings measurement data. The information about the uncertainty can be provided for example on the basis of the change (over time) in the surroundings measurement data. To this end, the surroundings measurement data are compared for example with surroundings measurement data from one or more preceding recursion steps and the change is ascertained on the basis of a deviation in respect of the surroundings measurement data from the one or more preceding recursion steps.

In some examples, the method further comprises predicting surroundings measurement data on the basis of the state function. Receiving information about the uncertainty can comprise determining a deviation between the sensor-captured surroundings measurement data and the predicted surroundings measurement data and also ascertaining the information about the uncertainty on the basis of the deviation between the sensor-captured surroundings measurement data and the predicted surroundings measurement data. The predicted surroundings measurement data are determined for example by means of the Bayes filter or Kalman filter. The deviation can be predicted in particular on the basis of a distance between the predicted surroundings measurement data and the sensor-captured surroundings measurement data in a common coordinate system.

Adapting the state inaccuracy can comprise adapting the state inaccuracy if the deviation between the sensor-captured surroundings measurement data and the predicted surroundings measurement data exceeds a predetermined threshold value. This allows undesirable fluctuations in the attenuation to be avoided.

Adapting the state inaccuracy can comprise in particular increasing the state inaccuracy if the deviation between the sensor-captured surroundings measurement data and the predicted surroundings measurement data is greater than the threshold value.

The method can further comprise capturing information about a speed of the vehicle, and receiving the information about the uncertainty can comprise receiving the information about the uncertainty on the basis of the information about the speed. It has been found that the accuracy of the surroundings measurement data can decline at lower speeds. In practice, this can cause undesirably high fluctuations in the estimated road profile. It is therefore proposed that the information about the uncertainty be ascertained on the basis of the speed. Accordingly, the Bayes filter can be attenuated by adapting the state inaccuracy on the basis of the speed.

The information about the uncertainty can contain information about the speed, and adapting the state inaccuracy can comprise adapting the threshold value on the basis of the information about the speed. As such, the threshold value can be raised for lower speeds of the vehicle in order to avert unintentional adaptations of the attenuation to the detriment of a more uneven driving behavior as a result of higher inaccuracy of the surroundings measurement data.

4

In other examples, the information about the uncertainty can comprise information about an uncertainty that is dependent on a distance of the vehicle, and adapting the state inaccuracy can comprise adapting the state inaccuracy on the basis of the information about the uncertainty that is dependent on the distance of the vehicle. The uncertainty that is dependent on the distance comprises for example a distance-dependent standard deviation of the estimated road profile (state function), which is ascertained on the basis of a comparison with other measurement data, such as for example movement measurement data ascertained by means of odometry or a locating method. The uncertainty that is dependent on the distance can in particular rise as the distance increases. Accordingly, adapting the state inaccuracy to adjust the attenuation can result in the attenuation rising in support of better estimation of the road profile as the distance from the vehicle increases.

To this end, the method can further comprise capturing surroundings measurement data relating to at least one object for a first vehicle position at a first distance from the object, capturing reference data relating to the same object for a second vehicle position at a second distance, which is shorter than the first distance, from the same object, capturing information about a movement of the vehicle between the first and second vehicle positions and ascertaining the uncertainty that is dependent on the distance from the vehicle on the basis of the information about the movement, the surroundings measurement data relating to the object and the reference data. The reference data, like the surroundings measurement data, can specify a measured attitude, position and/or a measured distance and can be assumed as a so-called "ground truth". The reference data can be taken as a basis for ascertaining an inaccuracy of the surroundings measurement data, and the information about the movement can be taken as a basis for ascertaining a distance when capturing the surroundings measurement data, so as then to take the inaccuracy and the distance as a basis for determining the distance-dependent uncertainty.

When a Kalman filter is used, the adaptation can be carried out using so-called "innovation", which involves comparing a prediction emerging from the state function with surroundings measurement data, and converting the prediction and/or the surroundings measurement data into a common coordinate system by means of a conversion rule, also called a measurement model, an observation model, an observation or state conversion rule. In some examples, the method further comprises obtaining an innovation uncertainty $S_{k-1}=H_k*P_{k|k-1}*H_k^T+R_k$ of the Bayes filter on the basis of the state inaccuracy $P_{k|k-1}$, a state conversion rule $H_k$ of the Bayes filter and the inaccuracy of the surroundings measurement data $R_k$, and determining the attenuation on the basis of the innovation uncertainty, the state conversion rule and the state inaccuracy. By way of example, the state conversion rule is used to convert a prediction for the innovation into a coordinate system of the surroundings measurement data, the so-called "measurement space". The innovation uncertainty can comprise a covariance.

In some examples, the Bayes filter comprises a Kalman filter. The attenuation of the Bayes filter can be dependent on $$K_k = P_{k|k-1}H_k^T S_k^{-1},$$

where $P_{k|k-1}$ is the state inaccuracy, $$H_k^T$$

is the state conversion rule and $$S_k^{-1}$$

is the innovation uncertainty. To increase the attenuation, the state inaccuracy can be raised. To lower the attenuation, the state inaccuracy can accordingly be lowered.

The method can further comprise capturing a process noise $Q_{k-1}$ and a state transition model $F_{k-1}$. Moreover, the state inaccuracy can be equal to $$P_{k|k-1} = F_{k-1}P_{k-1}F_{k-1}^t + Q_{k-1},$$

and adapting the state inaccuracy can comprise adapting the process noise $Q_{k-1}$. To increase the attenuation, the process noise can be increased, and it can be lowered to decrease the attenuation.

Other examples provide a computer program comprising commands that, when the program is executed by a computer, cause the computer to carry out an example of the method described herein.

Other examples provide a device comprising one or more interfaces for communication and a data processing circuit designed to supervise the one or more interfaces and to use the one or more interfaces to carry out an example of the method described herein.

Yet other exemplary elements provide a vehicle comprising an example of the device described herein.

BRIEF DESCRIPTION OF THE DRAWINGS

FIGS. 1a-1e show a procedure for estimating a road profile;

FIGS. 4a and 4b show time characteristics of the innovation of the Bayes/Kalman filter;

DETAILED DESCRIPTION OF THE DRAWINGS

Figure 1D:
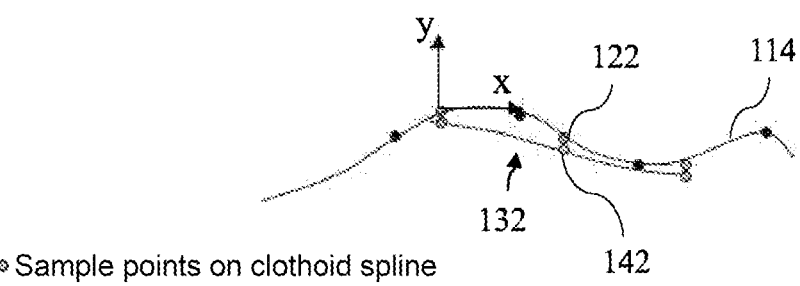

Various examples are now described in more detail with reference to the accompanying drawings, which present some examples. The thickness dimensions of lines, layers and/or regions may be presented in an exaggerated manner in the figures for the sake of clarity.

In the field of autonomous driving concepts, it may be of great significance for controlling, by way of example, autonomously driving vehicles to estimate the surroundings and the road profile. As such, the vehicle can be actuated for example in such a way that it regulates steering, acceleration, speed and other vehicle or driving parameters autonomously, without action by a driver, in such a way that the vehicle follows the estimated road profile safely, for example, and/or can avoid obstacles.

FIG. 1 shows an illustrative procedure for sensor- or camera-based estimation of a road profile.

In particular, FIG. 1a schematically shows a situation in which a (partially) autonomously driving vehicle 110 is situated and/or moving on a road having three adjacent lanes 102 that are each separated from one another by road boundaries, for example by crash barriers or, as in the present case, by lane markings 103. In the example shown, the vehicle 110 is situated in the middle lane of the lanes 102.

As illustrated in FIG. 1b, the vehicle 110 can initially assume or predict a state for the road profile. For this purpose, the vehicle 110 predicts (on the basis of a change model and the estimation of the road profile from a preceding recursion step) the road profile initially by way of a state function 114 comprising multiple segments 191-1 to 191-n. The segments may be described by arbitrary functions. Preferably, clothoid functions for the segments are used for the segments in support of simple illustration and as good an approximation of the road profile as possible. The individual segments can be completely characterized by the parameters $c_0$, $c_{1,n}$, $\theta_0$ and $y_0$, where $c_0$ specifies an initial curvature, $c_{1,n}$ specifies a curvature profile, $\theta_0$ specifies an orientation and $y_0$ specifies a y-axis section of the respective segment. For the state function, which, in the present case, can also be understood to mean a clothoid spline having n ($n \in \mathbb{N}$) clothoid segments, this would mean that the clothoid spline can be described by $4 \cdot n$ parameters. The clothoid spline shown in FIG. 1b satisfies connection conditions between the clothoid segments that can reduce the number of parameters needed for describing the clothoid spline, which means that the computation complexity for determining the clothoid spline is reduced. By way of example, the clothoid spline is consistent at the transition points, differentiable, and the curvature values of two successive clothoid segments are equivalent at the transition points 113. Under the mentioned connection conditions, the number of parameters needed for describing the clothoid spline can be reduced to $n+3$. The clothoid spline with reference point 112 $x_0$, $y_0$, initial curvature $c_0$ and orientation $\theta_0$ of the segment 191-1 can therefore be completely characterized by a reduced parameter set ($c_0$, $\theta_0$, $y_0$, $x_0$ and $c_{1,1} \ldots c_{1,n}$). By way of example, the state function 114 reproduces the profile of a road marking, in the present case for example the left-hand road marking of the lane that the vehicle 110 is in.

To approximately estimate the road profile, there is provision in the present case for the state function 114 to be adapted on the basis of observations. To this end, the vehicle 110 is equipped with a camera system or sensor system, for example, which is designed to sense the road markings and to deliver surroundings measurement data that at least approximately reproduce the profile of the road marking. In the present case, the surroundings measurement data comprise a polynomial function 132, for example, which is derived from recordings by the camera system or sensor system. Optionally, other functions can also be used as the polynomial function. In examples, there is for example provision for the state function 114 to then be approximated to the surroundings measurement data by means of an approximation method. A sampling method can be used for this, which involves adapting the state function 114 in such a way that a distance between sample points 122 of the state function and sample points 142 of the surroundings measurement data is decreased. The adapted state function obtained can then be used to control the vehicle 110. This procedure can be repeated iteratively and/or recursively while driving, for a continuously updated estimation of the road profile. In examples, for example a Kalman filter or another Bayes filter is used to estimate the road profile.

This sampling method involves adapting the state function for the observation data for example by ascertaining a deviation between corresponding sampling points on the state function 114 and the surroundings measurement data 132, and by virtue of the Bayes filter (e.g. Kalman filter) minimizing or at least reducing the (square) deviation of the sampling points by adapting parameters of the state function 114.

A disadvantage of this method, however, is that in some examples the parameters are adapted using only the attitude (x and/or y values) of the sampling points, while information about a profile of the surroundings measurement data between the sampling points 142 is ignored. As a result, there is the possibility that, although the (square) deviation between the sampling points is minimized, a form of the adapted state function does not match the form of the surroundings measurement data 132. This effect is particularly pronounced if only a few sampling points are available. This may be the case for example if the surroundings measurement data 132 (camera polynomials) are very short (e.g. due to a short visual range of the camera when a vehicle in front is concealing the road markings).

As shown in FIG. 1d, distances between the sampling points 122 on the state function 114 and the observation data are relatively small, but the curvature and tangent angle on the two curves 114 and 132 differ from one another greatly close to the origin (position of the vehicle). This can lead to inaccuracies when estimating the road, which can adversely influence automated control.

It is therefore proposed that the curvature and/or the tangent angle at the sampling points 122 be considered when adapting the state function 114 for the surroundings measurement data 132. This allows the state function 114 to be adapted more accurately for the surroundings measurement data 132.

Figure 1E:
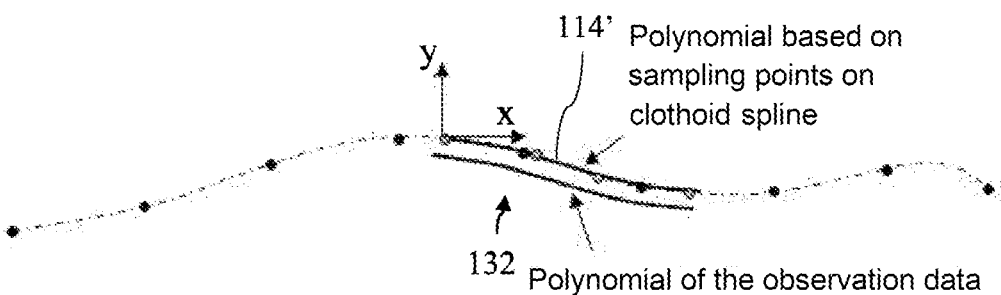

As shown in FIG. 1e, other approximation methods can also be applied as an alternative to sampling methods. In this case, for example a transformation of the state function into the measurement space can result in a polynomial 114' being generated that corresponds (e.g. by means of polynomial fitting) approximately to the state function 114 (clothoid spline). In this case, the polynomial 114' has the same degree (same number of polynomial coefficients) as the polynomial of the surroundings measurement data 132.

The polynomial 114' can be generated from the state function 114 by sampling for example 4 or a different number of points of the state function 114 and calculating appropriate polynomial coefficients of the polynomial 114' by means of a linear equation system that is based on the points (for example using a Vandermonde matrix).

Subsequently, parameters of the state function 114 can be adapted in such a way that a (square) distance (difference) between the coefficients of the polynomial of the surroundings measurement data 132 and the polynomial 114 ascertained from the state function 114 is minimized or at least reduced.

It has been found that the estimation of the road profile and in particular Bayes filters used therefor have an inertia that can lead to the road profile being adapted for current observations in an undesirably slow manner. This is the case for example when curves, obstacles or the like are detected late or later than usual.

There is therefore a need for an improved concept for estimating a road profile. In particular, there is a need for a concept for estimating a road profile with improved responsiveness.

Figure 2:
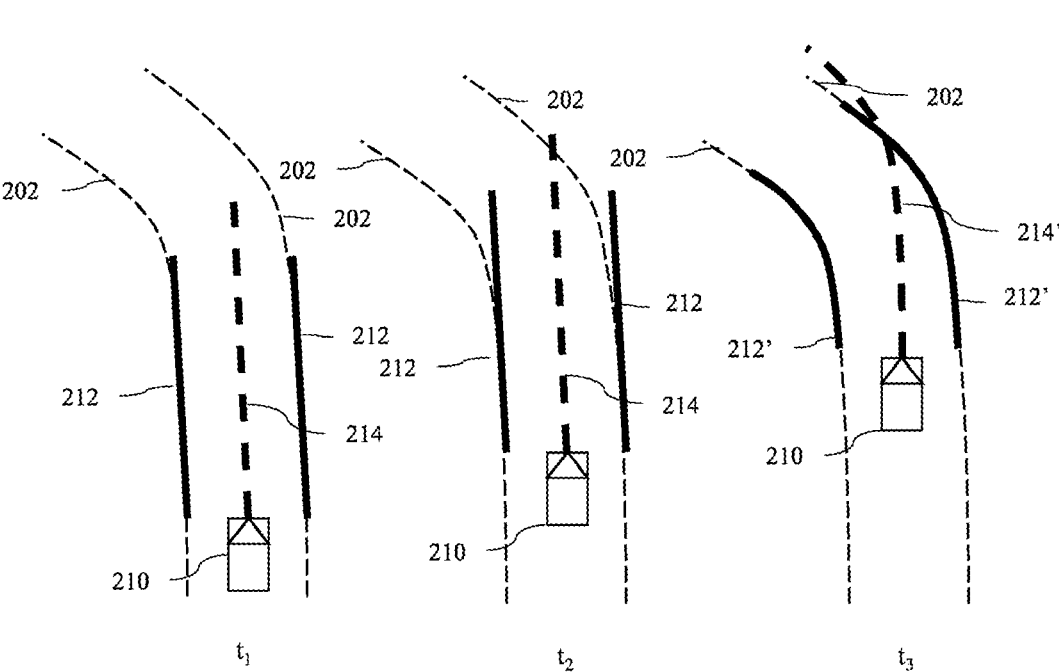
FIG. 2 shows an application for the proposed concept.

FIG. 2 shows an example of an illustrative application for such a method.

FIG. 2 shows situations for a vehicle 210 when approaching a curve at sequentially successive times $t_1$, $t_2$ and $t_3$.

As shown, in some situations there is the possibility of a camera system or sensor system of the vehicle 210 that delivers surroundings measurement data 212 for estimating the road profile initially not detecting or erroneously detecting an entrance to a curve and therefore delivering erroneous surroundings measurement data for an undesirably long time. In the present case, the surroundings measurement data 212 erroneously reproduce road boundaries 202, for example, at the times $t_1$ and $t_2$. Specifically, the surroundings measurement data 212 indicate a straight road profile in the present case by way of illustration, even though the road profile is actually curved.

On the basis of the surroundings measurement data 212, the procedure described above can be used to ascertain a state function 214 that reproduces the road profile by reproducing an "imaginary" centerline of the road. According to the surroundings measurement data 212, which incorrectly specify a straight road profile at the times $t_1$ and $t_2$, the state function 214 suggests a straight road profile to the vehicle 210.

If the camera system or sensor system then detects the curve at the time $t_3$ after a delay time $t_s = t_3 - t_1$ and the surroundings measurement data 212 from the camera system or sensor system convey the correct curved road profile, the form of the surroundings measurement data 212 changes abruptly.

A Bayes filter, in the present case for example a Kalman filter, which is used to estimate the road profile, has the property of filtering (attenuating) noisy and rapidly changing sensor data. It adapts the estimation of the road profile (state function 214 in the present case) for the observation data not instantaneously, but rather with a certain delay. In particular if the Kalman filter, as in the present case, receives an indication of a "straight" road profile on the basis of the surroundings measurement data 212 for a relatively long time, it becomes ever "more convinced" (belief) that a straight profile is present. If the camera system or sensor system then abruptly indicates significantly different surroundings measurement data 212', it takes some time (e.g. up to the time $t_4$) before the Kalman filter breaks down this established "conviction" (belief) again with the new information (evidence) and adapts the estimation for the new surroundings measurement data 212'. This leads to a further delay time $t_K = t_4 - t_3$. A total delay time is therefore $t_S + t_K$. The state function 214' estimated on the basis of the surroundings measurement data 212' can therefore deviate from the actual road profile, which can adversely affect a tracking stability of the vehicle 210.

In particular, it can lead to the vehicle 210 not being able to be kept in the middle of the lane and to the vehicle 210 unintentionally approaching the road edge on one side. For example, at a speed of 180 km/h, the vehicle covers 50 m in one second. With a delay time of t=200 ms, the distance covered is 10 m before the estimated centerline is adapted for the true curve profile. It is therefore beneficial to keep the delay time as short as possible.

A concept is therefore proposed that improves responsiveness for estimating the road profile and in particular can decrease the delay time for estimating the road profile.

Figure 3:
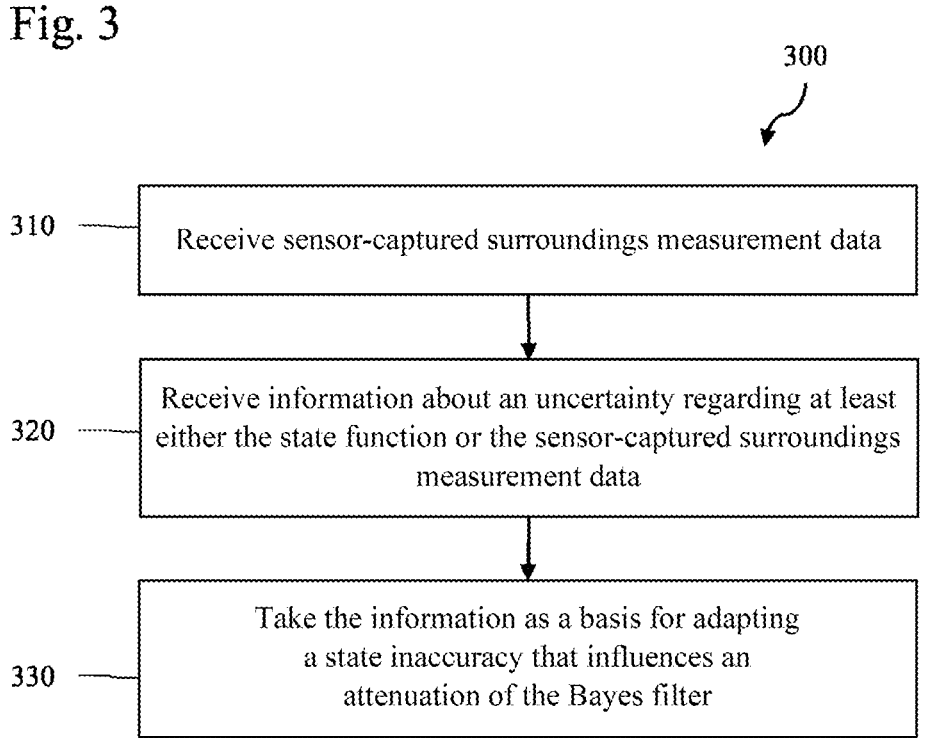
FIG. 3 shows a flowchart to schematically depict an example of a method for estimating a road profile.

FIG. 3 shows a flowchart to schematically depict an example of a method 300 for estimating a road profile in surroundings of a vehicle by using a state function that describes the road profile and a Bayes filter for adapting the state function on the basis of surroundings measurement data. By way of example, the state function is predicted on the basis of preceding estimates of the road profile and a change model, for example a movement model for the vehicle. This allows the Bayes filter to recursively estimate the road profile in temporally successive recursion steps.

The method 300 comprises receiving 310 sensor-captured surroundings measurement data. The surroundings measurement data can be captured by a camera system or sensor system (installed on the vehicle) for recording the surroundings, for example. Accordingly, the surroundings measurement data comprise recordings, image information, sensor data and/or information derived therefrom, for example. In other examples, the surroundings measurement data comprise a function (e.g. a polynomial function) approximated to the recordings, image information or sensor data, which function reproduces a profile of a road boundary or road marking, for example.

The method 300 further comprises receiving 320 information about an uncertainty regarding at least either the state function or the sensor-captured surroundings measurement data. Accordingly, the information about the uncertainty can relate to the state function or the surroundings measurement data but also to the state function and the surroundings measurement data. The information about the uncertainty indicates an inaccuracy and/or trustworthiness of the state function, or of the surroundings measurement data, for example. The information about the uncertainty can be specified as a measure of a deviation from the actual road profile and/or as a statistical variable, for example as a standard deviation or variance. As explained in more detail later, information about the uncertainty can be received on the basis of comparisons with preceding measurements, estimations and/or information about factors, such as for example weather conditions or a speed of the vehicle, that influence the uncertainty.

Moreover, the method 300 comprises taking the information as a basis for adapting 330 a state inaccuracy that influences an attenuation of the Bayes filter. The attenuation can be understood as a measure of the extent to which the sensor-captured surroundings measurement data and/or the predicted state function are used for estimating the road profile. The attenuation can therefore also be understood as a weighting for the surroundings measurement data, or the state function. In examples, the state inaccuracy comprises a parameter for specifying an uncertainty regarding a prediction of a recursion step, for example of the estimated/predicted state function. Accordingly, the state inaccuracy can also be understood as a prediction uncertainty.

The road profile can then be ascertained on the basis of the sensor-captured surroundings measurement data, the state function and the adapted attenuation, or the adapted state inaccuracy.

The method 300 can in particular be carried out within one of multiple successive recursion steps.

In examples, receiving 320 the information about the uncertainty can comprise receiving the uncertainty regarding the state function, or the surroundings measurement data, on the basis of the sensor-captured surroundings measurement data. To receive 320 the information about the uncertainty, the sensor-captured surroundings measurement data of one or more relatively recent recursion steps can be compared with surroundings measurement data from one or more earlier recursion steps, and information about the uncertainty regarding the state function, or the surroundings measurement data (of a current recursion step), can be ascertained on the basis of a deviation in the surroundings measurement data of the relatively recent and earlier recursion steps. The greater the deviation, the more uncertainly the state function is assessed, for example. Accordingly, the attenuation, or the state inaccuracy, can then be adapted in such a way that a weighting of the relatively recent surroundings measurement data is increased when adapting the state function, or a weighting of the state function is decreased when it is adapted.

As will be understood by a person skilled in the art benefiting from the present disclosure, the information about the uncertainty can optionally be provided in another way.

According to the method, Bayes filters can comprise prediction of surroundings measurement data on the basis of the state function. Receiving 320 information about the uncertainty can then optionally comprise determining a deviation between the sensor-captured surroundings measurement data and the predicted surroundings measurement data (the deviation is also referred to as "innovation") and ascertaining the information about the uncertainty regarding the state function on the basis of the deviation between the sensor-captured and predicted surroundings measurement data. By way of example, the predicted surroundings measurement data are ascertained on the basis of surroundings measurement data of a preceding recursion step, a change or transition model for calculating a transition for estimates between recursion steps, a state conversion rule (also called "surroundings model or measurement model") and a state disruption. The greater the deviation in the sensor-captured surroundings measurement data, the more uncertainly the state function or the surroundings measurement data can be assessed. Accordingly, the attenuation, or the state inaccuracy, can then be adapted in such a way that the weighting of the relatively recent surroundings measurement data is increased or decreased, or the weighting of the state function is decreased or increased.

The attenuation can be used to regulate or adapt the responsiveness of the Bayes filter in such a way that a driving behavior of the vehicle improves in particular when surroundings measurement data are uncertain or obstacles or road profiles are (unintentionally) detected late. In particular, the aforementioned delay time can be reduced, for example.

The method can also be applied in reverse at the end of curves, for example when sensors are unintentionally late detecting that the curve is ending and the observation data are adapted abruptly (sudden change from curved to straight).

Examples will be explained in more detail below with reference to the Kalman filter as the Bayes filter. However, it will be pointed out that explanations provided herein can also be applied to other Bayes filters (e.g. sequential Monte Carlo methods) analogously.

When a Kalman filter is used, the state function can be assumed as the state of the Kalman filter and the surroundings measurement data can be assumed as the observation of the Kalman filter, the state function being able to be specified as equal to x in examples, as indicated above, where $$x = \begin{bmatrix} x_0 \\ y_0 \\ \theta_0 \\ c_0 \\ c_{1,1} \\ \vdots \\ c_{1,n} \end{bmatrix}.$$

The state, or the adapted state function, for the recursion step with time index k can be calculated using $$x_{k|k} = x_{k|k-1} + K_k y_k$$

where $K_k$ determines the attenuation, $x_{k|k-1}$ is a predicted state function and $y_k$ specifies the innovation. $K_k$ is also referred to as "Kalman gain".

In the case of the Kalman filter, the Kalman gain is determined for example using $$K_k = P_{k|k-1} \cdot H_k^T \cdot S_k^{-1}$$

where:
- $P_{k|k-1}$ is the state inaccuracy (predicted for k), in the present case for example a predicted state covariance;
- $H_k$ is the observation model, in the present case for example a so-called "observation matrix"; and
- $S_k$ is an innovation uncertainty, in the present case for example an innovation covariance (also referred to as "residual covariance").

The higher $K_k$ is, the lower the attenuation of the Kalman filter. $K_k$ in turn rises as $P_{k|k-1}$ becomes greater. Accordingly, the attenuation can be adapted for the information about the uncertainty using $P_{k|k-1}$. If the uncertainty regarding the state function is greater and/or the uncertainty regarding the surroundings measurement data is lower, for example, $P_{k|k-1}$ can be chosen to be greater in support of a higher weighting of the surroundings measurement data. If the uncertainty regarding the surroundings measurement data is greater and/or the uncertainty regarding the predicted state function is smaller, $P_{k|k-1}$ can be chosen to be smaller in support of a higher weighting of the predicted state function, or lower weighting of the surroundings measurement data.

By way of example, the state inaccuracy is determined using $$P_{k|k-1} = F_{k-1} P_{k-1} F_{k-1}^T + Q_{k-1}$$

where:
- $F_k$ is the change or transition model, in the present case for example a transition matrix;
- $P_{k-1}$ is the state inaccuracy or state covariance of the previous time step; and
- $Q_k$ is a process noise or covariance of the process noise.

A person skilled in the art benefiting from the present disclosure will understand that there are multiple options for adapting the state inaccuracy.

According to the method, the attenuation is adapted for example by adapting $Q_k$ on the basis of the information about the uncertainty. This involves decreasing the attenuation by choosing $Q_k$ to be greater, for example, and lowering the attenuation by choosing it to be smaller. Optionally, parameters dependent on the information about the uncertainty can be used for adapting.

Adaptation is accomplished by increasing or decreasing $Q_k$ by a value $\Delta Q$, for example depending on the uncertainty. Alternatively, or additionally, a factor for adapting the state inaccuracy can be used.

The uncertainty can be specified as a standard deviation, variance or using another statistical variable (e.g. as a covariance).

In some examples, adaptation can be carried out (only) if a specific criterion is satisfied, for example if the uncertainty exceeds a predetermined limit value. If the uncertainty, for example the information about the uncertainty, is determined on the basis of the surroundings measurement data, adaptation can be carried out for example (only) if the surroundings measurement data have changed by a predetermined amount, for example if the surroundings measurement data have at least one predetermined deviation from surroundings measurement data of one or more preceding recursion steps and/or predicted surroundings measurement data.

Accordingly, $Q_k$ can be adapted using $$Q_k \rightarrow Q_k + \Delta Q$$

$$\text{IF } D > D_{limit}$$

where D is a measure of the change in the surroundings measurement data and $D_{limit}$ is a threshold value for the change.

By way of example, D is a measure of the distance between predicted and sensor-captured/measured surroundings measurement data. In particular, D can be the normalized innovation squared, also called the NIS value. The NIS value in this case corresponds to the square of the Mahalanobis distance DM between predicted and measured observation data. Accordingly, D is defined for example using $$D = D_M(z, \hat{z})^2 = (z - \hat{z})^T \cdot S_k^{-1} \cdot (z - \hat{z})$$

where $(z - \hat{z})$ is the innovation, or difference between measured and predicted surroundings measurement data.

If necessary, for example if D fluctuates beyond a predetermined measure, D can additionally be filtered.

One alternative is for D to be able to be high, in particular higher than $D_{limit}$, because the surroundings measurement data or the state function have a correspondingly high uncertainty. If curves are detected too late, for example, the surroundings measurement data have a comparatively low uncertainty relative to the state function, for example. In this case, a weaker attenuation of the surroundings measurement data is therefore desired. In other cases, for example in adverse weather conditions (snow, fog, etc.) or at high/relatively high speeds, the surroundings measurement data can have a higher uncertainty and fluctuate to a greater degree. By way of example, heavier attenuation of the surroundings measurement data is desired in this case. The information about the uncertainty can accordingly indicate whether there is provision for an increase or reduction in the attenuation, or state inaccuracy. Accordingly, the attenuation, or state inaccuracy, can be increased or decreased according to the method.

FIG. 4a shows an illustration of deviations between predicted and sensor-captured surroundings measurement data and how the deviations can be used to infer whether there is provision for an increase or decrease in the attenuation or the state inaccuracy.

In particular, FIG. 4a shows graphs 401, 402 and 403 in which a deviation between the predicted and sensor-captured surroundings measurement data on the basis of the innovation 432 (difference between the predicted and sensor-captured surroundings measurement data) is presented over time. To this end, the abscissa 410 of each of the graphs plots the innovation and the ordinate 420 plots the time.

As can be seen in graph 401, the innovation 432 can exceed a predetermined threshold value 442 (e.g. according to $D_{limit}$) and be greater than the threshold value 442 for a relatively long time. This is the case for example if a curve or other road profiles are unintentionally detected late and the surroundings measurement data deviate from the estimated road profile over multiple recursion steps. The estimated road profile can therefore accordingly be assessed as uncertain or at least as more uncertain than the surroundings measurement data, and faster adaptation for the surroundings measurement data may be desired. Accordingly, it is proposed that the attenuation be decreased in such cases in support of a faster response to the surroundings measurement data. In particular, there may be provision for the attenuation to be decreased if the innovation 432 exceeds the threshold value 442 for at least a predetermined period, in the present case for example at least for a predetermined period 443. It is then possible to refrain from adapting the attenuation if the innovation exceeds the threshold value 442 for less than the predetermined period and/or drops below the threshold value 442 again. By way of example, the threshold value 442 is chosen in such a way that it is at least as high as or greater than an otherwise customary noise, in the present case represented by curve 431.

As shown in graph 402, a further threshold value or limit value 444 can additionally be determined and, if the innovation 432 exceeds the threshold value 444 (for at least a predetermined period, not shown here), the automated or partially automated control can be deactivated or switched off. By way of example, as depicted in graph 402, the threshold value 444 is higher than the threshold value 442 and/or corresponds to a measure of the innovation 432 for which there is only just a minimum amount of certainty or accuracy. The automated or partially automated control can be activated or reactivated when the innovation 432 drops below the threshold value 444.

As can be seen in graph 403, the innovation 432 may be subject to larger fluctuations than usual, such as for example the usual noise 431. This is the case for example if the surroundings measurement data have a higher uncertainty than usual, for example given adverse weather conditions or other negative influences. In this case, the surroundings measurement data can then be regarded as uncertain and the attenuation can be increased in support of stable estimation of the road profile. The fluctuations can be appraised on the basis of a standard deviation or other statistical variable, for example, and the standard deviation or the other statistical variable can be taken as a basis for ascertaining whether the fluctuations are larger than usual. If this is the case, the surroundings measurement data can be assessed as so uncertain that a greater attenuation is desirable in support of more stable estimation of the road profile. The attenuation can then be increased accordingly.

Figure 4B:
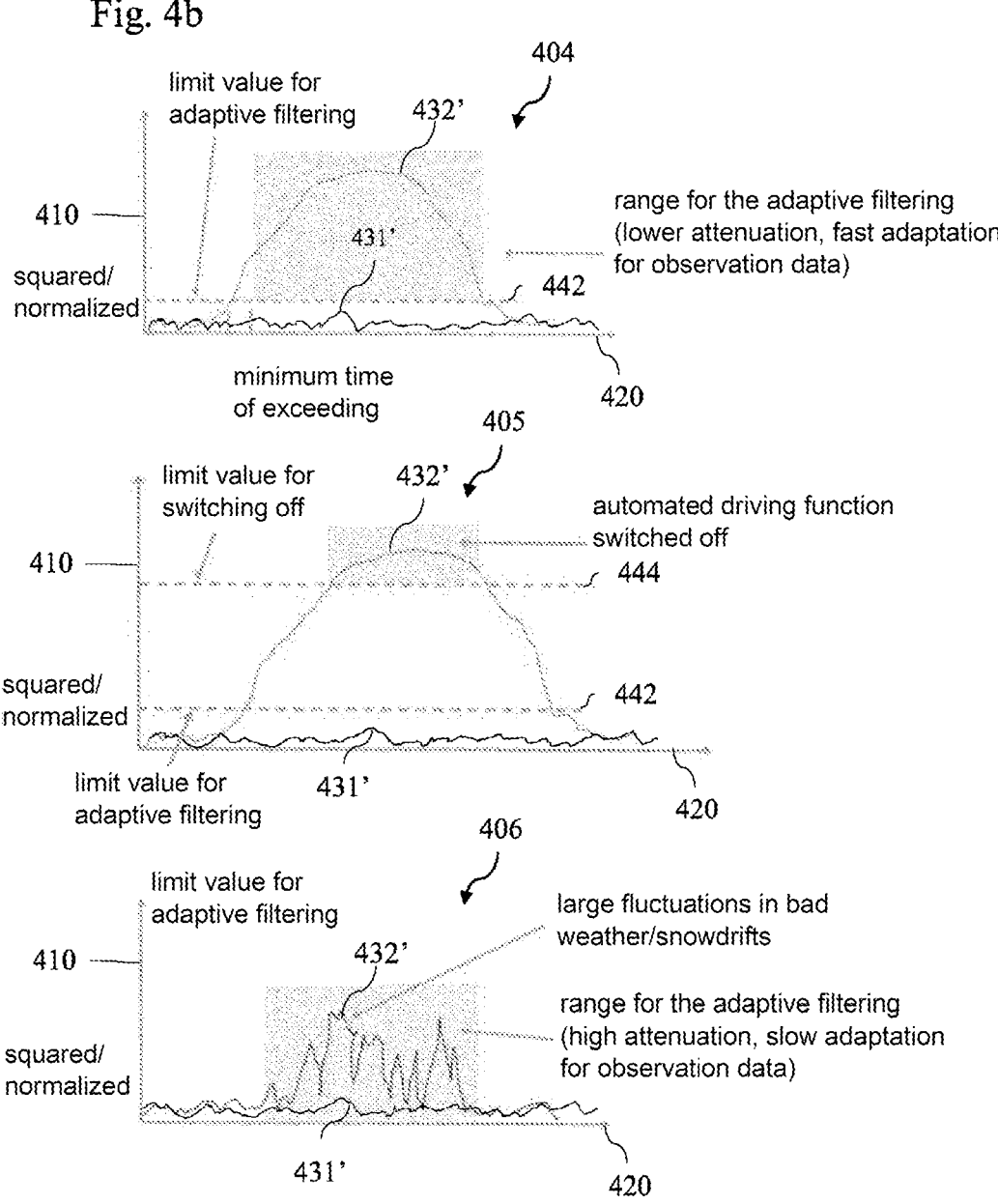

Optionally, better comparability can be attained, as depicted in FIG. 4b and corresponding graphs 404, 405 and 406, by analogously using a normalized measure of the deviation, for example the normalized innovation 432' and if necessary a normalized noise 431'.

In practice, the surroundings measurement data fluctuate more the lower the speed of the vehicle. If the vehicle is moving more slowly, for example in the region of an intersection, it may be that the surroundings measurement data have a poorer quality, since fewer locations in the surroundings are recorded in this case to the detriment of stabilization of the surroundings measurement data. There may therefore be abrupt changes in the surroundings measurement data at lower speeds. Fluctuations in the surroundings measurement data can in turn affect the estimation of the road profile, which means that the fluctuations lead to more uneven driving. According to the method, it is therefore proposed, in support of speed-adaptive adaptation of the attenuation, that the speed of the vehicle be ascertained and the state inaccuracy be adapted on the basis of the speed. By way of example, it is advantageous to attenuate the surroundings measurement data more heavily at lower speeds. The present subject matter therefore provides for the strength of the attenuation to be increased as the speed of travel decreases. Conversely, the attenuation can be chosen to be lower the higher the speed.

The information about the speed or the speed can be ascertained by means of speed sensors installed on the vehicle and/or by means of locating methods.

Optionally and when a threshold value is used, as above, the threshold value can be chosen on the basis of the speed for example. The threshold value $D_{limit}$ is defined for example using $$D_{limit} = D_{limit}(v)$$

where v is the speed of the vehicle. In particular, $D_{limit}(v)$ can rise as the speed v falls so that there are no unintentional adaptations and fluctuations of the attenuation at low speeds. On the other hand, $D_{limit}(v)$ can fall as the speed v rises, which means that the attenuation is adapted quickly if necessary, that is to say for relatively small changes in the surroundings measurement data.

Figure 5A:
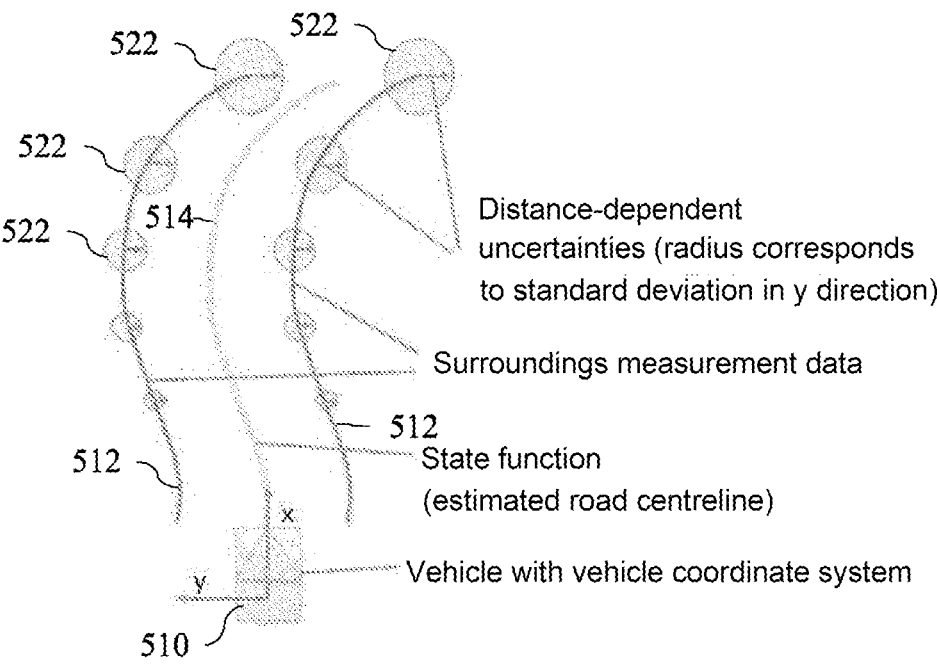
FIGS. 5a and 5b show the application and capture of a distance-dependent uncertainty.

As FIG. 5a shows, surroundings measurement data 512 can have a distance-dependent uncertainty 522 (in the x and/or y direction). By way of example, that is to say that surroundings measurement data relating to locations in the surroundings at a greater distance from the vehicle 510 have a greater uncertainty. In support of better attenuation, it may therefore be advantageous to provide a distance-dependent attenuation for adapting an estimation, for example of a state function 514 in the present case, using a Bayes filter. A greater attenuation can therefore be chosen for surroundings measurement data relating to greater distances of the vehicle 510 than for shorter distances, which have a lower uncertainty. To this end, information about a distance-dependent uncertainty regarding the surroundings measurement data can be used according to the method.

Figure 5B:
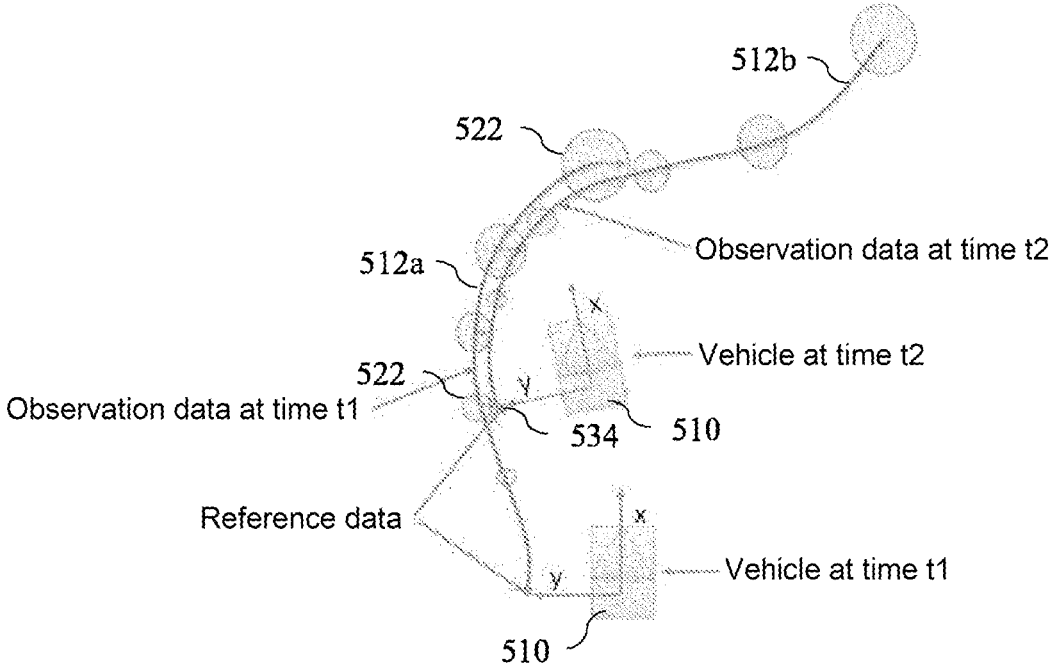

A person skilled in the art benefiting from the present disclosure will understand that the information about the uncertainty that is dependent on the distance can be received in various ways, one of which is shown in the present case on the basis of FIG. 5b.

FIG. 5b shows situations in which the vehicle 510 is at a first position at a first time t1 and records first surroundings measurement data 512a and is at a second position at a second time t2 and records second surroundings measurement data 512b. The distance-dependent uncertainty can be determined using a location or an object 534 in the surroundings reproduced by both the first and the second surroundings measurement data. The distance of the vehicle from this location or from the object 534 may be shorter at the time t2 than at the time t1. By way of example, the vehicle 510 passes the location or the object 534 at the time t2. The second surroundings measurement data 512b are therefore able to reproduce the location or the object 534 more accurately than the first surroundings measurement data 512a. The second surroundings measurement data 512b can therefore be used as reference data or "ground truth" for determining the distance-dependent uncertainty 522. Movement data can further be captured by the vehicle 510 to compare the surroundings measurement data 512a and 512b. The distance-dependent uncertainty 522 can then be determined for example by using the movement data to convert the surroundings measurement data 512a and 512b, as in the present case, into a common coordinate system. A distance between the surroundings measurement data 512a and 512b can then be determined for the location or the object 534 and the distance of the vehicle 510 from the location or the object 534 at the time t1 and the determined distance between the surroundings measurement data 512a and 512b can be taken as a basis for determining the distance-dependent uncertainty. In support of a finer distance-dependent uncertainty, this procedure can be used for multiple objects or locations. The distance-dependent uncertainty is specified as a distance-dependent standard deviation, for example. The movement data can be ascertained by means of odometry or locating methods, for example.

As an alternative or in addition to the procedure mentioned above for ascertaining distance-dependent uncertainty, recursive methods can also be applied. Recursive methods particularly permit recursive ascertainment, also referred to as "online determination", of distance-dependent uncertainty.

The distance-dependent uncertainty can optionally be specified in the factory.

There is also the possibility of the camera system or sensor system delivering no or incomplete surroundings measurement data from the environment.

A brief absence of surroundings measurement data can be compensated for, e.g. by the Kalman filter, when the road profile is estimated. If no more than a predetermined volume of surroundings measurement data is missing, the Kalman filter outputs a road profile that has been estimated in the preceding time step and corrected for a movement of the vehicle (prediction).

If no new surroundings measurement data are available for a relatively long time, however, it is assumed that this predicted road profile no longer matches the real road profile.

In this case, the vehicle is then no longer controlled on the basis of the predicted road profile. Monitoring of whether new surroundings measurement data from the sensor system or camera system are received and processed is proposed in this case. If no further new observation data have been processed for a predetermined period of time t, the road estimation is switched off so that erroneous or excessively incomplete road estimation is not used for automated control. By way of example, a driver of the vehicle is then asked to take over control of the vehicle.

Moreover, the Kalman filter can ascertain an uncertainty regarding the road estimation in successive time steps. When the vehicle is moving, this uncertainty increases. The processing of surroundings measurement data would reduce the uncertainty again. Since the uncertainty is not reduced in the absence of observation data, the uncertainty rises in the absence of observation data. Therefore, besides the monitoring over time, a level of the uncertainty regarding the road estimation is also monitored and the road estimation is likewise switched off if a limit is exceeded.

Specifically, a transformation is used to calculate the uncertainty between the vehicle and the estimated road boundary from the state function, and if this is exceeded then the road estimation is switched off.

In addition, there is the possibility that although the camera system or sensor system delivers surroundings measurement data, these are of insufficient quality, for example in the event of snowfall, heavy rain, fog or a soiled road. In some cases, the sensors themselves can ascertain the quality of the surroundings measurement data they produce. To this end, the camera system or sensor system delivers not only the surroundings measurement data but additionally quality values, such as for example a statement about a probability of existence of a road marking or a recursively estimated standard deviation of a geometry of the road marking.

Accordingly, it is proposed that the surroundings measurement data be assigned measures of quality and that surroundings measurement data having inadequate measures of quality, e.g. if they fall short of a limit value, not be used, in particular not be used for estimating the road profile.

If the camera system or sensor system delivers no measures of quality, measures of quality can optionally be ascertained separately.

The measures of quality may also need to be filtered prior to comparison with a limit value.

According to another aspect, a probability of existence of the surroundings measurement data can be monitored, and if it is below a certain threshold then the surroundings measurement data are not used for estimating the road profile. Moreover, a large fluctuation in the probability of existence can indicate poor observation data.

In the region of roadworks, a changed road profile is indicated by a special marking. Sometimes, however, this special marking cannot be distinguished by the camera system or sensor system from the marking that is customary outside the roadworks. There is the possibility of the camera system or sensor system therefore delivering multiple alternative surroundings measurement data.

If the surroundings measurement data of both the special marking and the markings that are customary outside the roadworks are used for road estimation, an incorrect estimated road profile is obtained. There is therefore provision for only one instance of the alternative observation data to be used if the camera system or sensor system cannot distinguish the special marking from the marking that is customary outside the roadworks. In particular, the alternative for which a difference between the predicted road profile and observation data (Mahalanobis distance) is smallest is selected.

Figure 6:
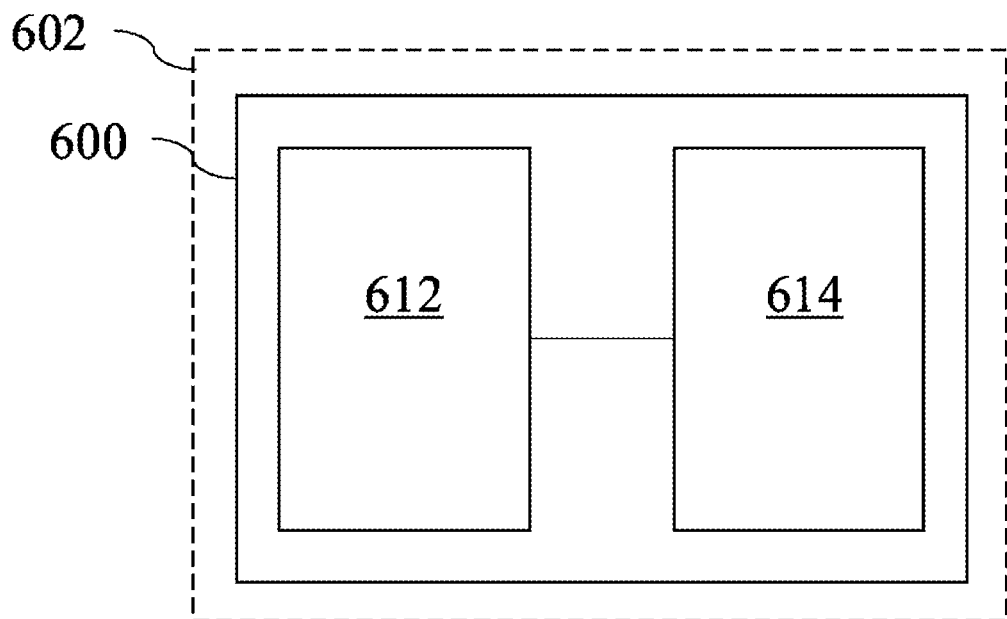
FIG. 6 shows a block diagram to schematically depict an example of a device according to the proposed concept.

The concept described herein may, as shown in FIG. 6, be implemented in a device 600 (for a vehicle 602).

The device 600 comprises one or more interfaces for communication 612 and a data processing circuit 614 designed to supervise the one or more interfaces 612 and to use the one or more interfaces 612 to carry out an example of the method described herein.

The one or more interfaces 612 are connected to the data processing circuit 614 and can comprise in particular one or more interfaces to a camera system or sensor system of the vehicle 602 in order to capture surroundings measurement data relating to surroundings of the vehicle 602 from the camera system or sensor system according to the method. The one or more interfaces 612 can further also comprise one or more interfaces to an electronic control unit of the vehicle 602 in order to provide the electronic control unit with the road profile estimated according to the method for the purpose of (partially) automated control of the vehicle or for the purpose of displaying the road profile for an occupant. In examples, the one or more interfaces 612 can comprise contacts (pins), transmitting and receiving components and/or other means for transmitting information.

In examples, the data processing circuit 614 can comprise any electronic means for electronic information processing, for example a microcontroller, a processor (core), a graphics processor and/or the like. The data processing circuit 614 may be configured by means of software components and/or hardware components to implement the concept proposed herein, in particular in order to perform steps of the information or data processing for implementing this concept. In particular, the proposed concept may be implemented in a computer program that comprises commands that, when the program is executed by the data processing circuit 614, cause the data processing circuit to carry out the method proposed herein.

It will be noted that explanations relating to the method described herein apply equally to the device that is described.

Functions of different elements shown in the figures and also the designated function blocks can be implemented in the form of dedicated hardware, e.g. "a signal provider", "a signal processing unit", "a processor", "a controller" etc., and as hardware capable of executing software in conjunction with associated software. When provided by a processor, the functions can be provided by a single dedicated processor, by a single jointly used processor or by a plurality of individual processors, some or all of which can be used jointly. However, the term "processor" or "controller" is far from being limited to hardware capable exclusively of executing software, but rather can encompass digital signal processor hardware (DSP hardware), network processor, application specific integrated circuit (ASIC), field programmable logic array (FPGA=Field Programmable Gate Array), read only memory (ROM) for storing software, random access memory (RAM) and nonvolatile memory device (storage). Other hardware, conventional and/or customized, can also be included.

A block diagram can illustrate for example a rough circuit diagram which implements the principles of the disclosure. In a similar manner, a flow diagram, a flowchart, a state transition diagram, a pseudo-code and the like can represent various processes, operations or steps which are represented for example substantially in a computer-readable medium and are thus performed by a computer or processor, regardless of whether such a computer or processor is explicitly shown. Methods disclosed in the description or in the patent claims can be implemented by a component having a means for performing each of the respective steps of the methods.

It goes without saying that the disclosure of a plurality of steps, processes, operations or functions disclosed in the description or the claims should not be interpreted as being in the specific order, unless this is explicitly or implicitly indicated otherwise, e.g. for technical reasons. The disclosure of a plurality of steps or functions therefore does not limit them to a specific order, unless the steps or functions are not interchangeable for technical reasons. Furthermore, in some examples, an individual step, function, process or operation can include a plurality of partial steps, functions, processes or operations and/or be subdivided into them. Such partial steps can be included and be part of the disclosure of the individual step, provided that they are not explicitly excluded.

Although some aspects have been described in the context of a device, it is clear that these aspects also constitute a description of the corresponding method, where a block or a device corresponds to a method step or to a function of a method step. Analogously to this, aspects described in the context of a method step also constitute a description of a corresponding block or element or of a property of a corresponding device.

LIST OF REFERENCE SIGNS

101 road
102 lanes
103 road boundaries
110 vehicle
112 reference point
113 transition points
114 state function
114' polynomial
122 sample points
132 surroundings measurement data
142 sample points
191-$n$ segments
202 road boundaries
210 vehicle
212 surroundings measurement data
212' surroundings measurement data
214 state function
214' state function
300 method for estimating a road profile
310 receiving sensor-captured surroundings measurement data
320 receiving information about an uncertainty
330 adapting a state inaccuracy that influences an attenuation of the Bayes filter
401-406 graph
410 abscissa
420 ordinate
431 noise
432 innovation
442 threshold value
443 duration
444 threshold value
510 vehicle
512 surroundings measurement data
512$a$ first surroundings measurement data
512$b$ second surroundings measurement data
514 state function
522 uncertainty regarding the surroundings measurement data
534 location or object
600 device
602 vehicle
612 one or more interfaces
614 data processing circuit

What is claimed is:

1. A method for controlling an autonomous vehicle, comprising:

controlling an automated guidance of the vehicle based on a road profile estimated using a state function describing the road profile and a Bayes filter that adapts the state function based on sensor-captured surroundings measurement data;

receiving the sensor-captured surroundings measurement data;

receiving information about an uncertainty of the state function or the sensor-captured surroundings measurement data; and adapting a state inaccuracy that influences an attenuation of the Bayes filter based on the information.

2. The method according to claim 1, wherein the receiving the information about the uncertainty comprises: receiving the uncertainty based on the sensor-captured surroundings measurement data.

3. The method according to claim 2, further comprising:

predicting surroundings measurement data based on the state function, wherein the receiving information about the uncertainty comprises:

determining a deviation between the sensor-captured surroundings measurement data and the predicted surroundings measurement data, and ascertaining the information about the uncertainty based on the deviation between the sensor-captured surroundings measurement data and the predicted surroundings measurement data.

4. The method according to claim 3, wherein the adapting the state inaccuracy comprises: adapting the state inaccuracy if the deviation between the sensor-captured surroundings measurement data and the predicted surroundings measurement data exceeds a predetermined threshold value.

5. The method according to claim 4, wherein the adapting the state inaccuracy comprises: increasing the state inaccuracy if the deviation between the sensor-captured surroundings measurement data and the predicted surroundings measurement data is greater than the threshold value.

6. The method according to claim 4, wherein the information about the uncertainty contains the information about speed of the vehicle, and wherein adapting the state inaccuracy comprises: adapting the threshold value based on the information about the speed.

7. The method according to claim 1, further comprising:

capturing information about a speed of the vehicle, wherein the receiving the information about the uncertainty comprises: receiving the information about the uncertainty based on the information about the speed.

8. The method according to claim 1, wherein the information about the uncertainty comprises: information about an uncertainty regarding the surroundings measurement data that is dependent on a distance of the vehicle, and wherein the adapting the state inaccuracy comprises: adapting the state inaccuracy based on the information about the uncertainty that is dependent on the distance of the vehicle.

9. The method according to claim 8, further comprising:

capturing surroundings measurement data relating to at least one object for a first vehicle position at a first distance from the object;

capturing reference data relating to the same object for a second vehicle position at a second distance, which is shorter than the first distance, from the same object;

capturing information about a movement of the vehicle between the first and second vehicle positions; and ascertaining the uncertainty that is dependent on a distance from the vehicle based on the information about the movement, wherein the surroundings measurement data relates to the object and the reference data.

10. The method according to claim 1, further comprising:

receiving an innovation uncertainty regarding the Bayes filter based on the surroundings measurement data and a state conversion rule of the Bayes filter; and determining the attenuation based on the innovation uncertainty, the state conversion rule, and the adapted state inaccuracy.

11. The method according to claim 10, wherein the Bayes filter comprises a Kalman filter, wherein the attenuation of the Bayes filter is dependent on $$K_k = P_{k|k-1} H_h^T S_k^{-1},$$

wherein $P_{k|k-1}$ is the state inaccuracy, wherein $$H_k^T$$

is the state conversion rule, and wherein $$S_k^{-1}$$

is the innovation uncertainty.

12. The method according to claim 11, further comprising:

capturing a process noise $Q_{k-1}$ and a state transition model $F_{k-1}$, wherein the state inaccuracy is equal to $$P_{k|k-1} = F_{k-1} P_{k-1} F_{k-1}^t + Q_{k-1},$$

and wherein adapting the state inaccuracy comprises: adapting the process noise $Q_{k-1}$.

13. A non-transitory computer-readable medium comprising instructions operable, when executed by one or more computing systems, to perform the method of claim 1.

14. A device comprising:

one or more interfaces for communication; and a data processing circuit configured to:

supervise the one or more interfaces and to use the one or more interfaces to:

receive sensor-captured surroundings measurement data;

receive information about an uncertainty regarding at least either a state function that describes an estimated road profile or the sensor-captured surroundings measurement data; and take the information as a basis for adapting a state inaccuracy that influences an attenuation of a Bayes filter for adapting the state function based on surroundings measurement data.

15. A vehicle comprising the device according to claim 14.

* * * * *